Sept. 11, 1934.  M. FERRERO ET AL  1,972,928
SEARCHLIGHT FOR EXPLORING THE SKY
Filed Nov. 12, 1932  2 Sheets-Sheet 1

MARIO FERRERO
ETTORE SALANI
INVENTORS
BY Haseltine, Lake & Co. ATTORNEYS

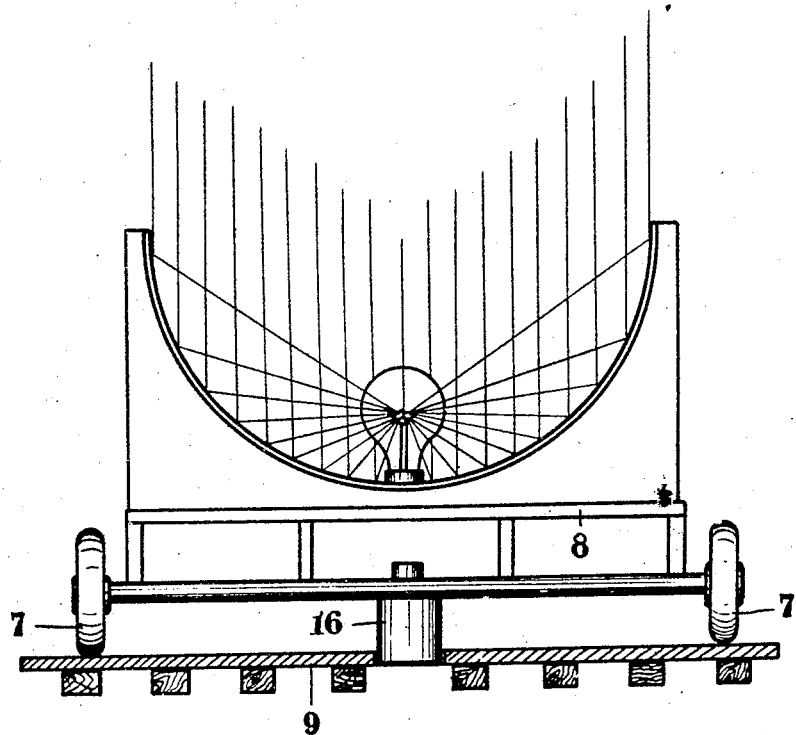

Patented Sept. 11, 1934

1,972,928

UNITED STATES PATENT OFFICE 1,972,928

SEARCHLIGHT FOR EXPLORING THE SKY

Mario Ferrero and Ettore Salani, Rome, Italy

Application November 12, 1932, Serial No. 642,374
In Italy November 19, 1931

2 Claims. (Cl. 240—1.2)

The present invention refers to the construction of a searchlight primarily intended for the exploration of the sky by illuminating successively all parts of the same so as to facilitate the task of discovering and following the position of any aircraft which may happen to be travelling within reach of its beam of light.

With this object in view the reflecting surface of the searchlight according to the present invention, instead of including the usual form of a surface of revolution, has the form of a parabolic cylinder, so that when the reflector is placed with its focal line in a horizontal direction, it produces a fan shaped beam of light passing through the zenith of the place and extending downward to two diametrically opposite points of the horizon. When such a searchlight is rotatably mounted on a central vertical pivot, the searchlight during its rotation will illuminate successively all the parts of the sky, thus rendering it quite easy to detect the presence of any aircraft, and to follow its course, particularly if it travels in one of the vertical planes passing through the place of observation, because in such case it will remain continually within the beam of light without moving the searchlight, which would never be possible with reflectors having the form of a surface of revolution.

While it has already been proposed to apply sheet glass in molded parabolic supports, yet the very limited range of elasticity of glass prevents the same from being applied in extensive sheets which would cover more than a very small portion of such supports, and also only utilize a small portion of the light from the source thereof. While it has also been proposed to apply strips or foils to molded templets, it is now proposed herein to provide means for retaining said strips or foils in position thereon and also for compensating for the expansion and contraction of the strips resulting from the effects of heat.

It is to be remarked, however, that, in order to illuminate at one time a strip of the sky extending thus between two opposite points of the horizon, the searchlight of the usual size would be altogether inadequate. On the other hand it would be a costly, difficult, or in fact, an impossible task to build glass reflectors of the size required, for instance covering about 40 to 50 square meters of surface.

According to the present invention, said problem is solved in a simple way by taking advantage, in the construction of the mirrors, of the elasticity of thin metal sheets which allow of their bending, thus causing them to adhere to and to exactly reproduce the shape of the support on which they are applied, said supports having been previously cut or bent to the desired shape, with the result that the metal sheets applied thereon, are finally disposed in accordance with the proper form of the reflecting surface. It will be apparent that by mounting several sheets of metal side by side so that one adjoins the other, each sheet being one or two meters wide, it will be possible to build reflectors of any size desired.

The annexed drawings show schematically by way of example the construction of a parabolic-cylindrical mirror according to the invention, in which Fig. 1 shows the cross section through the searchlight, in a plane perpendicular to the generatrix of the cylinder.

Fig. 3 shows the searchlight mounted on a revolving truck, capable of rotating round its central vertical axis.

Figure 1:
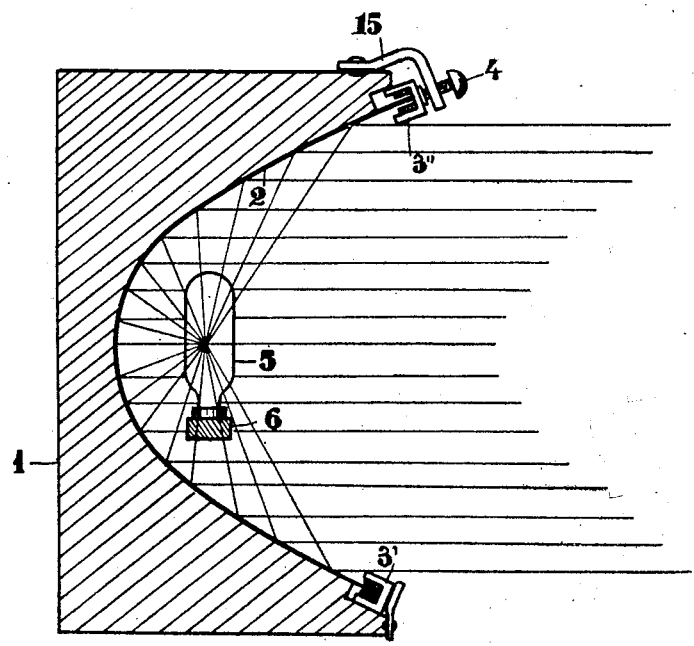
Figure 2:
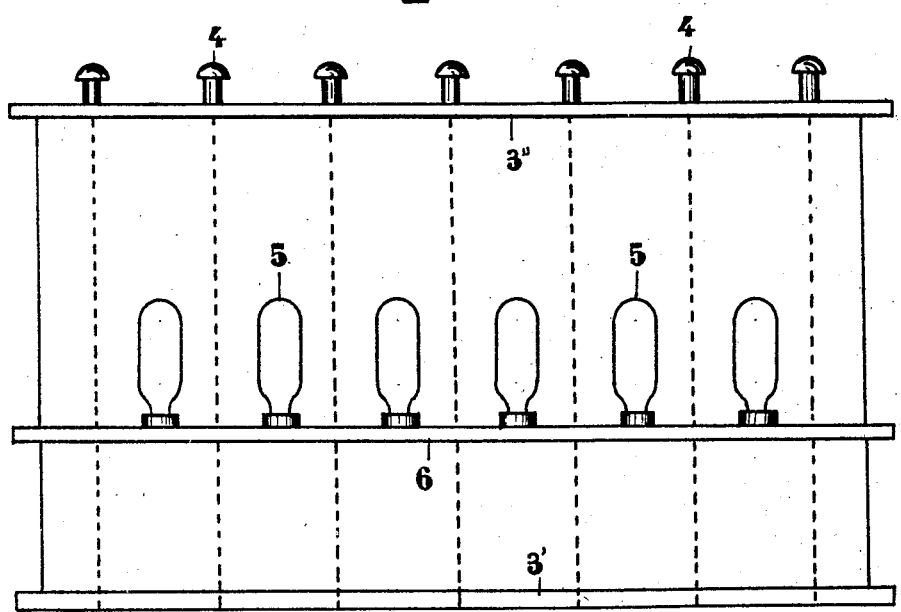
Fig. 2 shows the searchlight in front elevation.

As shown in the drawings, the searchlight comprises a series of supporting plates or girders 1 (having a parabolic profile in the case under consideration) which are mounted parallel with respect to each other, against the surface of which one or more rectangular sheets 2 are applied by bending the same, the concave part of which is polished and covered by electrolytic deposition of a metal so as to obtain a mirror surface (silver, gold, nickel, chromium etc.). The edges of the sheet penetrate into the concave part of two U shaped irons 3', 3'', which serve as continuous abutments, for obtaining the pressure equally distributed, and one of which, 3'', is adjustable by means of the screws 4 passing through the supports 15, or by any other convenient means, so as to make certain that the sheet 2, when inflected, may be laid precisely on the supports. The said supports are constructed in such manner as to allow the movements of the flexible sheet due to thermal action.

Moreover, in order to diminish or to annul the said movements, it is convenient to use, for the construction of the supports and of the metal sheets, materials having approximately the same coefficient of thermal dilation or expansion.

A series of ordinary lamps 5 carried by a support 6, or a single tubular lamp disposed along the focal line of the reflector, constitute the source of light.

Fig. 3 shows the searchlight mounted on a revolving truck 8 carried by the peripherical wheels 7 running round a central vertical pivot 16, on a suitable flat platform 9. By rotating the said truck, the searchlight will illuminate successively all the parts of the sky, and it will thus be easy to discover and to follow the position of any aircraft travelling within reach of its beam of light.

We claim:

1. A cylindrical parabolic reflector for seachlights adapted to project a narrow beam of light passing through the zenith above said reflector and extending between two opposite points of the horizon, including the combination of a support which is rotatable in a horizontal plane about a pivot having a vertical axis, a plurality of parallel spaced templets rigidly secured upon said support and having corresponding concave interior profiles, and flexible reflecting polished sheet metal bent and fitted to and resting on the interior profile edges so as to connect all of said templets and form a concave horizontal cylindrical reflecting member which is open along the top and a plurality of lights disposed in a horizontal row within said reflecting member.

2. A searchlight reflector according to claim 1, wherein the flexible polished sheet metal which is fitted against the interior profile edges of the templets in order to conform to the concave shape thereof, has the upper edges fitted against abutments for retaining said sheet metal in position, while the abutments against which one of said edges abuts is yielding in order to allow expansion and contraction of said sheet metal due to thermal action during service.

MARIO FERRERO.
ETTORE SALANI.